Aug. 10, 1965   C. I. WILLIAMS   3,199,721
WRENCH COUPLING
Filed July 22, 1963
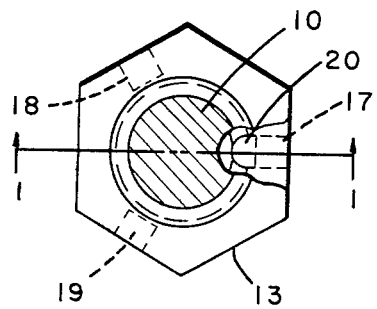
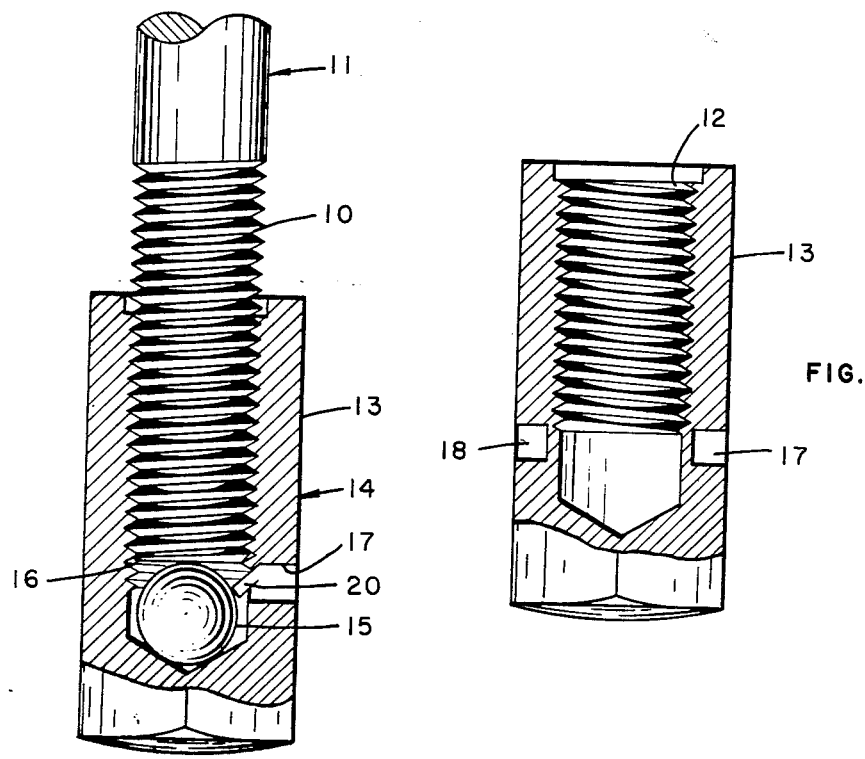
CHESTER I. WILLIAMS
INVENTOR.

3,199,721
WRENCH COUPLING
Chester I. Williams, 347 Greenbriar SE.,
Grand Rapids, Mich.
Filed July 22, 1963, Ser. No. 296,614
2 Claims. (Cl. 81—53)

This invention relates to the construction of coupling devices for transferring torque from a power-driven wrench to the end of a threaded rod or stud. It is common practice to use a socket with a threaded bore engaging the threaded end of a driven member, with a degree of penetration into the socket limited by an abutment. When the end of the threaded member engages this abutment, the socket becomes locked to the rod or stud, and is then capable of transferring torque to it.

The problem is connection with these devices is how to remove the coupling socket after the driving has been completed. The friction at the interengagement of the threads is substantial, and the added friction at the end abutment often makes it difficult or impossible to remove the coupling without back-rotating the driven member.

The present invention provides an inexpensive structure reducing the jamming friction to a minimum by restricting the contact of the end abutment to the central area of the driven member near the axis of rotation. Friction forces here therefore produce a minimum torque. An end abutment having this characteristic is provided by the use of a preferably hardened ball dropped into the socket bore, and retained in assembled position by a deformity in the socket wall. The several features of the invention will be analyzed in further detail through a discussion of the particular embodiment illustrated in the accompanying drawings. In the drawings:

FIGURE 1 illustrates a sectional view of a coupling socket in the driving position on the end of a threaded rod.

FIGURE 2 illustrates the condition of the body of the coupling device prior to the assembly of the ball.

FIGURE 3 illustrates an end view, partially in section, illustrating the wall deformity of the body which retains the abutment ball in assembled position.

Referring to the drawing, the threaded end 10 of the rod 11 is engaged by the threaded bore 12 in the body 13 of the coupling device indicated generally at 14. The bore 12 extends only over a fractional portion of the axial length of the body 13, and a solid barrier is provided at the inner end against which the abutment ball 15 may rest under the forces applied by the end 16 of the rod 11. When the end 16 of the rod 11 encounters the ball 15 and pushes it into solid engagement with the interior end of the bore 12, relative rotation of the coupling with respect to the rod 11 (in the direction to increase the depth of penetration) will stop. At that point, the coupling device will be capable of transferring driving torque to the rod 11.

When it becomes necessary to unscrew the coupling 14 from the rod 11, the contact of the ball 15 with the end 16 of the rod adjacent the rod axis will produce a minimum resistance to relative rotation between the body 13 and the threaded end 10. The device is therefore comparatively easy to unscrew, and the removal torque will normally be sufficiently low that it will not cause back-rotation of the rod 11.

The body 13 is preferably provided with a group of recesses or indentations, as indicated at 17–19. After the ball 15 has been dropped into the bore 12, the material at the inner extremity of the recess can be displaced as shown at 20 in FIGURE 1 so that the ball becomes entrapped at the inner end of the bore 12. The threading in the bore 12 will normally not extend to the full depth of the bore, and it is immaterial whether or not it does. It is only desirable that the threaded end 10 of the rod be engageable to a sufficient depth to crowd the ball 15 against the end of the bore. The nature of the deformity 20 is not critical, and may amount to a lancing of a portion into the position shown in FIGURE 1, or the material at the base of the depressions may be given a rounded contour extending radially inward into the bore 12 without separating the material in the process of deforming it. This latter type of deformity would take on the appearance of rounded projections extending inwardly into the bore; and in either type of projection it is important that the axial position of these along the body 13 will be such that the end of the rod 16 is not interfered with. This relationship is provided by locating the projections beyond the innermost position of outer surface of the ball in the bore 12.

In most applications of the device, it is desirable that the outer surface of the body 13 be hexagonal in cross-section, or of some other polygonal configuration to facilitate the engagement of a wrench. This is not critical, however, as there are a variety of torque-transfer devices that are fully capable of engaging a cylindrical surface. The ball 15 is easily obtainable in the form of a hardened steel ball bearing, and these are readily available in bulk at reasonable cost.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:
1. A wrench coupling for transferring torque to a threaded rod-end, said coupling comprising:
   a body having a polygonal cross section and having a bore with a threaded portion adapted to receive said rod-end, said bore extending only over a fractional part of the length of said body,
      said body having at least one peripheral recess at an intermediate point along said body, and
   a bearing member inserted in said bore, said bearing member having clearance with respect to the wall of said bore, said body having at least one portion thereof at said recess extending radially inward from the wall of said bore to entrap said bearing member, said portion being disposed axially inward in said bore from the innermost position of the outer portion of said insert member.
2. A wrench coupling for transferring torque to a threaded rod-end, said coupling comprising:
   a body having a bore with a threaded portion adapted to receive said rod-end, said bore extending only over a fractional part of the length of said body, and
      a bearing member inserted in said bore, said bearing member having clearance with respect to the wall of said bore, said body having at least one portion thereof extending radially inward from the wall of said bore to entrap said bearing member, said portion being disposed axially inward in said bore from the innermost position of the outer portion of said bearing member.

(References on following page)

References Cited by the Examiner

UNITED STATES PATENTS

| | | |
|---|---|---|
| 2,121,035 | 6/38 | Hollister. |
| 2,216,878 | 10/40 | Densmore _____ 29—441 X |
| 2,361,046 | 10/44 | Molly _____ 29—441 X |
| 2,521,910 | 9/50 | Goldberg. |
| 2,535,293 | 12/50 | Kruse _____ 81—121–1 X |

FOREIGN PATENTS 346,351 11/04 France,
847,429 8/52 Germany.

OTHER REFERENCES

Popular Mechanics, September 14, 1931, page 5, "A Tool for Driving Studs."

WILLIAM FELDMAN, *Primary Examiner*.